Sept. 7, 1943.    A. F. MYERS    2,329,075
TORQUE DIVIDING MECHANISM
Filed Nov. 4, 1941    3 Sheets-Sheet 1

INVENTOR
Albert F. Myers
Cameron, Kerkam & Sutton
ATTORNEYS.

Sept. 7, 1943.   A. F. MYERS   2,329,075

TORQUE DIVIDING MECHANISM

Filed Nov. 4, 1941   3 Sheets—Sheet 2

INVENTOR
Albert F. Myers
Cameron, Kerkam+Sutton
ATTORNEYS

Sept. 7, 1943.  A. F. MYERS  2,329,075
TORQUE DIVIDING MECHANISM
Filed Nov. 4, 1941  3 Sheets-Sheet 3
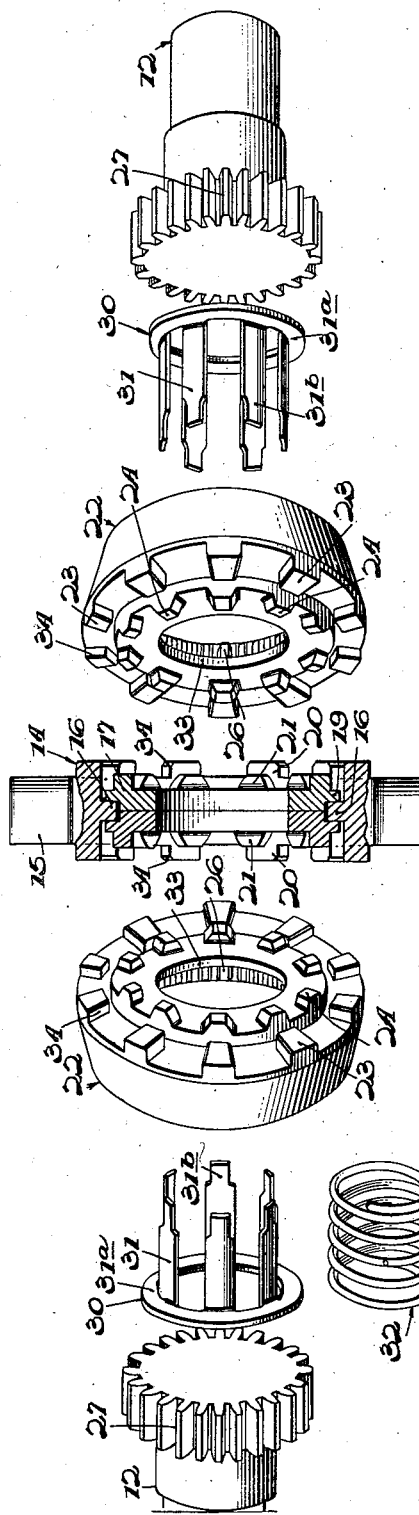
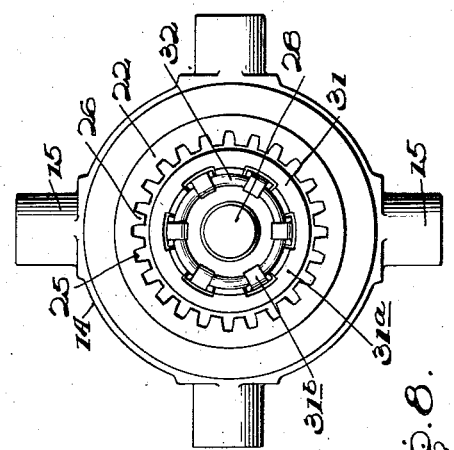
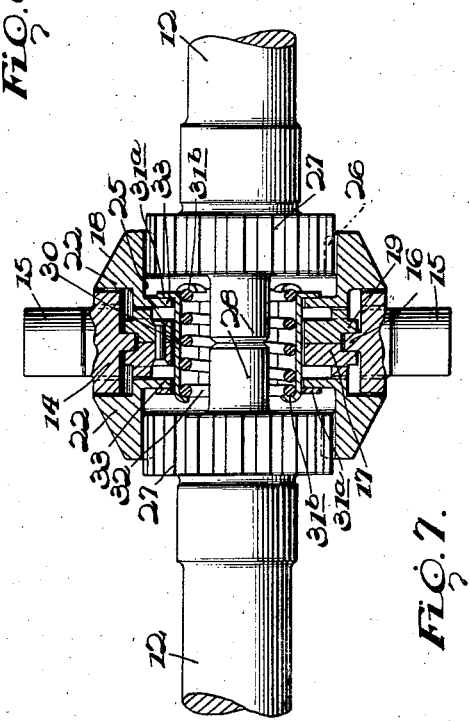
INVENTOR
Albert F. Myers
Cameron, Kerkam & Sutton
ATTORNEYS.

Patented Sept. 7, 1943

2,329,075

UNITED STATES PATENT OFFICE 2,329,075

TORQUE DIVIDING MECHANISM

Albert F. Myers, Berkley, Mich., assignor, by mesne assignments, to Patent Developers, Inc., Detroit, Mich., a corporation of Michigan Application November 4, 1941, Serial No. 417,829

18 Claims. (Cl. 74—389.5)

This invention relates to torque dividing mechanisms of the clutch type, and more particularly, although not exclusively, to an improved mechanism of this character adapted for use in structures such as land vehicles, and particularly motor vehicles, in place of a conventional differential device. In order to simplify the following description of the invention, the subject matter thereof will hereinafter be referred to as an "axle compensator."

One of the objects of the present invention is to provide an improved axle compensator particularly for use in a motor vehicle, which compensator, unlike the conventional differential device, ensures transmission of driving torque to at least one driving wheel of the vehicle under all road conditions, thereby preventing stalling of the vehicle on the road because of lack of traction. It is commonly known that one of the most serious disadvantages of conventional differential devices is the possibility of spinning of one wheel of the vehicle with no driving torque delivered to the other wheel. This condition is responsible for frequent stalling of motor vehicles on the road when one wheel of a vehicle becomes free to spin whenever its frictional engagement with the road surface is destroyed by contact, for example, with mud or ice.

Another object of the invention is to provide an improved compensator device for vehicles, which enables starting of a vehicle even if one of the wheels thereof is not in sufficient frictional contact with the road surface to permit transmission of a driving force to the vehicle. It is known that starting of vehicles equipped with conventional differential devices is impossible except when each of the driving wheels is able to deliver sufficient driving force to the vehicle. This is not possible if one wheel is free to rotate.

A further object of the invention is to provide an axle compensator in which means are provided whereby positive driving engagement of one of the half axles with the final drive gears is not affected by the disengagement of the other half axle therefrom. With most of the devices now known intended for similar use, disengagement of one half axle affects adversely the operative engagement of the other half axle, which is very objectionable from the standpoint of safety and smooth operation.

A still further object of the invention is to provide an improved axle compensator which prevents dangerous spinning of either driving wheel such as may occur during high speed operation of a vehicle, as for example when a driving wheel runs off from the hard road surface and contacts the soft shoulder of a highway.

A still further object of the invention is to provide an improved axle compensator for a vehicle which effects considerable reduction in the tire wear and greatly increases the life of tires, particularly in high powered motor vehicles.

Still another object of the invention is to provide an axle compensator of the character described embodying a novel spring arrangement for yieldably urging the driven members of the compensator into operative engagement with the driving members, which arrangement also serves the additional function of holding the various elements of the device together in properly assembled relation so as to form a readily handleable, unitary structure, capable of direct association as a unit with the two shafts which are to be differentially driven.

It is an added object of the present invention to provide an improved axle compensator possessing the foregoing and other advantageous features, and which in addition thereto is simple in construction, safe and dependable in operation, and relatively inexpensive to repair and service.

Other objects of this invention will appear in the following description and appended claims, reference being had to the accompanying drawings forming a part of this specification wherein like reference characters designate corresponding parts in the several views.

Fig. 6 is an exploded view, partly in section and partly in perspective, showing the operative parts of the axle compensator of Figs. 1–4.

Fig. 7 is a view similar in part to Fig. 4, both jaw clutches being shown engaged.

Fig. 8 is an end view of the axle compensator shown in Fig. 7 looking from the left-hand side thereof, but with the left-hand half axle and the driven clutch member normally connected thereto removed.

Figure 1:
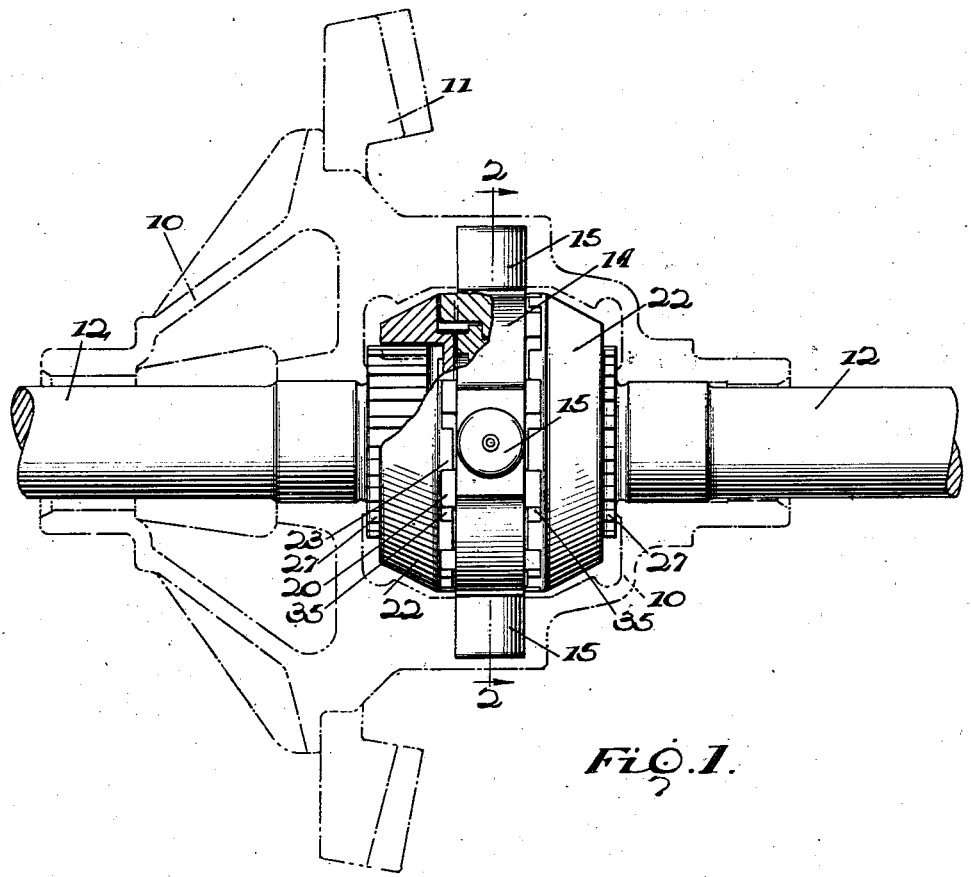
Fig. 1 is a view, partly in section, of one form of axle compensator embodying the present invention, there being shown in broken lines a differential housing and ring gear of conventional design with which the compensator may be associated for the purpose of differentially driving the two half axles or shafts likewise shown in assembled relationship with the compensator.
Figure 2:
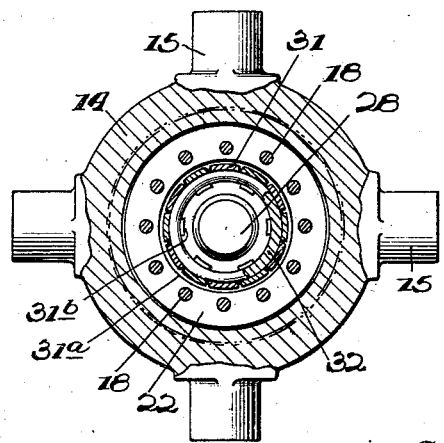
Fig. 2 is a sectional view taken in the direction of the arrows on the vertical transverse plane passing through the line 2—2 of Fig. 1.
Figure 3:
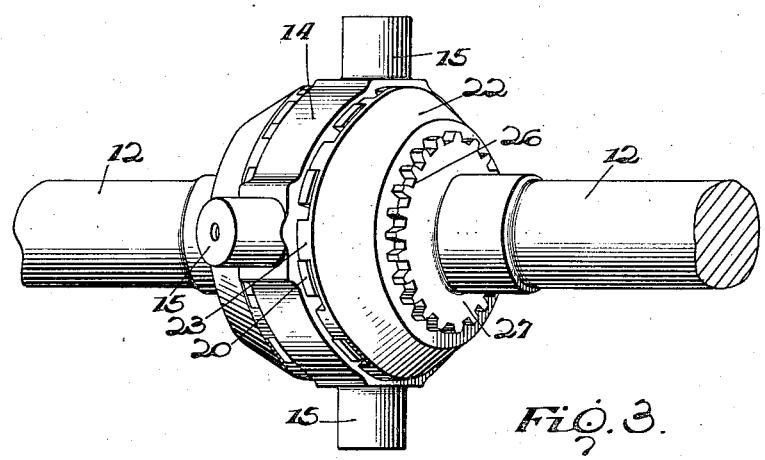
Fig. 3 is a perspective view of the axle compensator and shaft assembly of Fig. 1 with the differential casing and ring gear removed.

Before explaining in detail the illustrated form of the present invention, it is to be understood that the invention is not limited in its application to the details of construction and arrangement of parts shown in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, an axle compensator such as may be used for motor vehicles in place of a conventional differential. It will be understood, however, that the compensator device of my invention may be used in other connections, such, for instance, as for operatively connecting two opposed shafts, transmitting power to said shafts from a single source and permitting one shaft to run ahead of the other.

The device embodying the present invention comprises generally: first, two clutches, preferably of the jaw type, driven preferably from a single source, each of said clutches being connected to the end of one of the opposed shafts; and second, means operated by the shaft which tends to turn faster than the other shaft, with the aid of which the clutch connected to such faster rotating shaft is disengaged, permitting said shaft to run freely ahead of the other shaft. The arrangement of the operative parts of my improved device is such that disengagement of one of the clutches produces a more firm engagement of the other clutch, and thus ensures that the driving torque is transmitted to the more slowly rotating shaft.

Fig. 1 illustrates an axle compensator embodying the present invention, said compensator being operatively mounted within a differential casing 10 to which is secured in a manner well known in the art a ring gear 11. The compensator connects two opposed, substantially abutting half axles or shafts 12. The casing 10 and the ring gear 11 are of conventional designs and dimensions, while the compensator device of my invention is made of such dimensions as to fit within said casing interchangeably with the usual differential, by virtue whereof my axle compensator device may be installed within a conventional vehicle by removing the conventional differential therefrom and installing my improved axle compensator. The above feature of interchangeability with devices of conventional construction is an important advantage of my improved device.

The axle compensator illustrated in the drawings is symmetrical on both sides of a transverse plane passing through its center. Consequently, for the sake of simplicity of the following description, the same numerals will be assigned to the similar parts of the compensator wherever two of them are provided, one on each side of said plane. Whenever it becomes necessary to distinguish between such similar parts as to the mode of their operation, they will be distinguished by reference to the right-hand side or the left-hand side of the compensator, considering the above mentioned plane as a division plane.

Referring to the drawings, the driver member of the compensator device illustrated therein consists, in the present embodiment, of a driving spider 14 provided with a plurality, in the present instance four, of lugs 15 with the aid of which the spider is drivably connected with the differential housing 10.

The spider member 14 is of an annular shape and on its inner cylindrical surface has a radially inwardly projecting shoulder 16, which shoulder is embraced by an annular inner member 17 consisting of two similar halves which are secured together in any suitable manner, such as with the aid of rivets 18, to form in effect a single member mounted within said spider member 14 for independent rotation therein, but being restrained from independent axial movements by its radially outwardly projecting flange portions 19 which bear against the parallel sides of the shoulder 16 of the spider member 14. Thus, after the sections of the inner member 17 are riveted together, the spider 14 and the member 17 present, for the purposes of assembly, a single articulated member.

On each side surface of the spider member 14 there is formed a plurality of driving clutch teeth 20, while on each side face of the inner member 17 there is formed a plurality of slanted teeth 21, which latter teeth are termed, for the reason explained below, the "driven slip clutch teeth."

On the opposite sides of the centrally located spider member 14 there are provided two outer or outside members 22 of generally annular form, on the inner side face of each of which members there are provided two concentric rows of clutch teeth 23 and 24. Teeth 23 of the outer row are of the same character as the driving clutch teeth 20 and are meshed therewith in the operative positions of the respective members, and therefore represent driven clutch teeth. The inner circular row is formed by slanted teeth 24, which teeth are of the same character as the teeth 21 of member 17 with which they are adapted to mesh. For the reason explained below, the teeth 24 are termed the "driving slip clutch teeth." In the outer face of each of said outer members 22 there is provided a bore 25, on the cylindrical surface whereof there are formed internal gear teeth 26 which are adapted to mesh with the external teeth of the gears 27 integrally formed on shafts 12. The shafts 12 may, if desired, be provided with tail extensions 28 adapted to extend inwardly through the bores of the outer members 22 and inner member 17 and to abut in the central transverse plane of the compensator.

Surrounding the tail extensions 28 and within the bores of the inner member 17 and outer members 22 there is provided a telescopic spring-carrying cage formed by two cage members 30, shown in Fig. 6 in their unassembled form. Each cage member 30 consists of a plurality of relatively thin, elongated fingers 31 secured to, and extending parallel to one another in an axial direction from circumferentially spaced portions of, a radially outwardly projecting flange 31a, the spaces between the fingers 31 being of substantially the same width as the fingers themselves. When the two cage members are assembled in interdigitated relationship, with the fingers 31 of one member fitting snugly into the spaces between the fingers of the other member and the flanges 31a in engagement with the outer faces of the inwardly projecting flanges or shoulders 33 of the outer members 22, a substantially cylindrical cage is formed in which is placed a coil spring 32 of a diameter only slightly less than that of the cage. The spring 32 is then compressed axially, and while so retained, the finger tips 31b of the cage members 30 are bent inwardly as shown in Fig. 7, locking the spring within the cage so formed.

If external forces are now applied to the flanges 31a tending to pull them apart, the bent finger tips 31b will tend to compress the spring 32. By virture of such a construction, the outer members 22 are at all times yieldably urged inwardly toward the spider member 14 and inner member 17 to maintain meshing of the jaw clutch teeth 20 and 23, as well as slip clutch teeth 21 and 24. Outward movements of said members 22 are therefore yieldably opposed by the spring 32. Although the distance between the flanges 31a is increased upon outward movement of the members 22, it will be noted that the portion of the cage within which the spring is housed is simultaneously shortened or compressed.

Due to the fact that the fingers 31 of the two cage members 30 mesh with one another with negligble clearance in a circumferential direction, the cage is a functionally integral structure which shields the spring 32 from torsional stresses that would otherwise be imposed thereon when there is relative rotational movement between the shafts 12. That is, even though the flanges 33 of the outer members 22 may rotate relatively to and in frictional contact with the flanges 31a of the cage when one shaft overruns the other, the torque thus created is not transmitted to the spring because of the non-rotatable, interlocking relationship of the two halves of the cage.

It will also be noted that, once the spring 32 has been locked in its cage in the manner illustrated in Fig. 7, the entire assembly of spider member 14, inner member 17, outer members 22, cage members 30 and spring 32 becomes a unitary structure, ready for direct installation in the differential housing 10 and operative association with the gears 27 of the shafts 12 which are to be defferentially driven.

By virtue of the above described construction, there are provided, in effect, in my improved axle compensator, two jaw clutches, one for each of the two opposed shafts or half axles 12, which jaw clutches connect drivingly and positively the spider 14 with both of the half axles or shafts 12 for transmission of the driving torque or effort thereto.

Referring now to Fig. 7 in which both of said jaw clutches are shown engaged, it can be seen that the driving effort transmitted to the lugs 15 from the ring gear 11 through the differential housing 10 is transmitted by the driving jaw clutch teeth 20 to the driven jaw clutch teeth 23 meshing therewith, thereby effecting rotation of the outer members 22. From the outer members 22 the rotative effort is transmitted by the gear teeth 26 to the gears 27, and finally to the shafts 12 which may carry the driving wheels of a vehicle on their outer ends. As long as both shafts operate at the same rotative or angular speed, the above described positive connection remains intact, and both wheels receive a substantially equal share or amount of the driving torque. Such is the condition when the vehicle operates along a straight highway or moves along a straight line on a smooth surface.

Should, however, one of the shafts begin operating at a greater speed than the other, or as it is expressed in the art, should begin overrunning the other shaft, certain parts of my improved axle compensator operate to disengage the respective jaw clutch, thereby disconnecting or destroying the positive driving connection between the spider member 14 and the respective shaft 12 and permitting said shaft to run ahead of the other shaft, which latter shaft then receives the entire driving torque.

In the present embodiment of the invention, the means effecting such disconnecting of the jaw clutches are represented by the meshing slanted teeth 21 and 24 forming in effect two slip clutches within the compensator, one for each of the shafts 12. It should be understood at this point that while the teeth 21 and 24 are of such a character that they have practically no back lash or clearance between them, the jaw clutch teeth 20 and 23 have a back lash or clearance 35 between them, see Fig. 1, which back lash is equal to or slightly exceeds the distance by which each of the slanted teeth 21 or 24 has been narrowed by the slanting. By virtue of such a construction, disengagement of teeth 20 and 23 is permitted when one of the outside members 22 is rotated by the overrunning shaft 12. The angle on which the teeth 21 and 24 are slanted is so selected that the mutual pressure on said teeth produces components in the axial direction of the compensator. Since in operation axial movement of the inner member 17 is prevented by the shoulder 16, such components become effective to move the outer members 22 outwardly in an axial direction for disengaging the jaw clutches, the teeth 20 and 23 of the jaw clutch members being chamfered as indicated at 34 to facilitate engagement and disengagement thereof. It should also be understood that in the process of disengagement of teeth 21 and 24 of the slip clutch on the overrunning side, the reactive force for the driving slip clutch teeth 24 is provided by the driving teeth 20 of the opposite jaw clutch, which reactive force is transmitted from the said driving teeth 20 to the driven jaw clutch teeth 23 meshing therewith and then through the driving slanted teeth 24 of said opposite clutch to the cooperating driven slanted teeth 21, which driven teeth are, of course, fixed with respect to the driven slip clutch teeth 21 of the overrunning side and thus support the latter in position to react against the overrunning driving slip clutch teeth 24.

Figure 4:
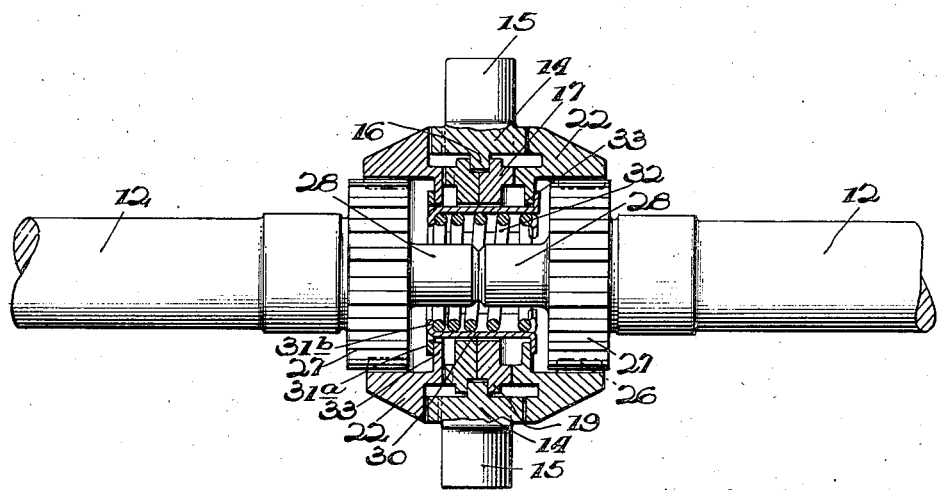
Fig. 4 is a longitudinal section of the structure shown in Fig. 3, certain parts being shown in full and the right-hand jaw clutch being shown disengaged.
Figure 5:
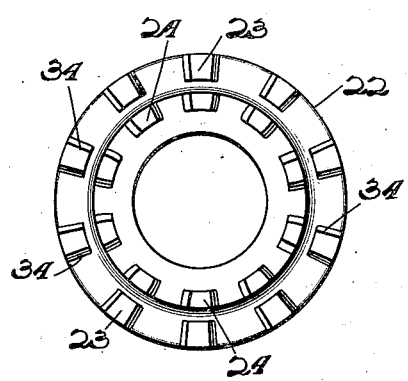
Fig. 5 is an end view of one of the driven clutch members of the device of Figs. 1–4.

After the jaw clutch is disengaged, the overrunning outside member 22 will continue running ahead of the spider member 14, riding from tooth to tooth and jumping into and out of engagement in the jaw clutch as long as the shaft 12 continues runnig ahead. Fig. 4 illustrates the relative positions of the operative parts of the compensator with the right-hand shaft 12 running ahead of the left-hand shaft and with the right-hand jaw clutch disengaged. After such overrunning ceases, both jaw clutches are again engaged as shown in Fig. 7.

Operation of the left-hand portion of the device is similar to that of the above described right-hand portion thereof. When the direction of rotation of the shafts changes, which occurs when the vehicle is operated in reverse, the operation of the device is similar to the above described operation, the only difference being that, because of the changed direction of the force exerted by the spider member 14, the back lash 35 in the jaw clutch teeth 20 and 23 is produced on the opposite side of said teeth from that shown in Fig. 1. In reversing the direction of the drive, the spider member 14 also rotates relatively to the inner member 17 by an amount approximately equal to that of the back lash.

It is an important advantage of the present invention that disengagement of either of the jaw clutches does not affect adversely the positive engagement of the other clutch. In fact, whenever one of the outer members 22 is moved into clutch disengaging position, the compression of the spring 32 caused by the outward movement of the cage member 30 whose flange 31a engages the shoulder 33 of the overrunning member 22 is transmitted through the other cage member to the opposite outer member 22 and tends to urge the latter even more forcefully into clutching engagement with the spider member 14.

In addition, it is also important to note that in vehicles equipped with my improved axle compensator no objectionable acceleration of driving wheels in the air may occur. It is appreciated that in vehicles equipped with conventional differential devices, should one wheel be separated from the road surface for a moment of time, which occurs as the vehicle travels over a rough road, the wheel accelerates to a considerable degree and on coming in contact with the road surface again rotates faster than is necessary for rolling. The wheel then "runs ahead of the road" and for a considerable portion of a revolution rubs the road surface. Since in such acceleration the spinning wheel has behind it the entire power and inertia of the engine, abrasion of the tire is considerable and life of the tire is greatly decreased. Such a possibility is eliminated with the use of my improved compensator, since the driving wheel which leaves the ground will continue to be driven at the same speed as the wheel in contact with the road, and whatever "running ahead" may take place for any reason will have behind it only the inertia of the wheel and the associated half axle, which is negligible from the standpoint of tire wear.

Although the foregoing description and the accompanying drawings relate to only one specific structure by which the objects and advantages of my invention may be attained, it will be obvious that the invention is not limited either to the particular device disclosed or to use in a motor vehicle, but is capable of a variety of mechanical embodiments. Various changes, which will now suggest themselves to those skilled in the art, may thus be made in the form, details of construction and arrangement of the parts without departing from the spirit of the invention. Reference is therefore to be had to the appended claims for a definition of the scope of the invention.

What is claimed is:

1. In a device for transmitting driving torque to two opposed shafts capable of overrunning each other, two jaw clutches adapted to transmit driving effort to said shafts, respectively, a pair of slip clutches, one for each of said jaw clutches, each of said slip clutches having a driving section adapted to be operably connected with one of said shafts for rotation therewith and a driven section associated with the driving portion of the respective jaw clutch, and being adapted to be operated by its respective shaft for disconnecting the respective jaw clutch when the said shaft is overrunning the other shaft, the driving clutch portions of said jaw clutches being formed as integral parts on both sides of a single annular member, the driven clutch sections of said slip clutches being formed as separate elements and positioned within the bore of said annular member, and means for securing said driven slip clutch members together, said means being so constructed and arranged that said driven sections are freely rotatable relatively to said annular member.

2. A torque transmitting device according to claim 1, including means on said annular member for preventing axial movement of said driven slip clutch sections with respect to said annular member.

3. In a device for transmitting driving torque to two opposed shafts capable of overrunning each other, an annular central driving member having driving clutch teeth formed on both side faces, an inner central member positioned within the bore of said annular member and having driven slip clutch teeth formed on both side faces, said inner member being freely rotatable relatively to said annular member, and means for preventing axial movement of said inner member relatively to said annular member.

4. In a device for transmitting driving torque to two opposed shafts capable of overrunning each other, an annular spider mmber adapted to be drivably connected to the source of driving torque, said spider member being arranged in a plane substantially perpendicular to said shafts, driving teeth formed on both side faces of said spider member, an inner central member mounted in the bore of said spider member and freely rotatable relatively thereto, and means fixing said spider and inner member against relative axial movement.

5. In a device for transmitting driving torque to two opposed shafts capable of overrunning each other, an annular spider member adapted to be drivably connected to the source of driving torque, said spider member being arranged in a plane substantially perpendicular to said shafts, driving teeth formed on both side faces of said spider member, an annular shoulder projecting radially inwardly from the bore of said spider member, an inner central member mounted in the bore of said spider member and made in two sections embracing said shoulder, and means for securing said sections together at points within the bore of said annular shoulder, whereby said inner central member is freely rotatable, but axially immovable, relatively to said spider member.

6. In a device for transmitting driving torque to two opposed shafts capable of overrunning each other, an annular spider member adapted to be drivably connected to the source of driving torque, said spider member being arranged in a plane substantially perpendicular to said shafts, driving teeth formed on both side faces of said spider member, an inner central member mounted in the bore of said spider member and freely rotatable relatively thereto, driven slip clutch teeth formed on both side faces of said inner member, means fixing said spider and inner member against relative axial movement, two outer members drivingly connected to said shafts, driven teeth on the inner faces of said outer members adapted to mesh with said driving teeth on said spider member and thereby provide a positive driving connection between said spider and said shafts, driving slip clutch teeth provided on said outer members and meshing with the driven teeth of said inner member, said slip clutch teeth of each outer member being adapted to move the respective outer member outwardly for unmeshing said driven teeth thereof from the driving teeth of said spider member when the respective shaft tends to run ahead of the other shaft, and a single spring acting on said outer members and yieldably resisting unmeshing movements thereof.

7. A torque transmitting device according to claim 6 wherein the spring means comprises a single coil spring arranged centrally of said inner member and operatively connected to both of said outer members so as to yieldably oppose the unmeshing movements thereof.

8. A torque transmitting device according to claim 6 wherein the spring means comprises a single compression spring arranged centrally of said inner member, and a pair of cooperating cage members housing said spring and so connected to both the spring and said outer members as to compress said spring upon unmeshing movement of either of said outer members.

9. A torque transmitting device according to claim 6 wherein the spring means comprises a single coil spring arranged centrally of said inner member, and means forming a cage for said spring so connected to said outer members as to compress said spring upon unmeshing movement of either of said outer members, said cage means also being so constructed and arranged as to shield said spring against torsional stresses when there is relative rotation between said outer members.

10. In an axle compensator for a vehicle having two opposed axle shafts, a final drive gear and a housing secured thereto: a spider drivably mounted within said housing, driving clutch teeth provided on both side faces of said spider, a driven slip clutch member having teeth formed on both side faces, said member being mounted in said spider and capable of rotational movement relatively thereto, two outer members arranged on opposite sides of said spider and having driven clutch teeth meshing with the driving teeth of said spider, means drivingly connecting said outer members with said shafts, driving slip clutch teeth formed on both of said outer members and meshing with the teeth formed on said driven slip clutch member and adapted to ride over the latter and thereby disengage the respective outer member from said spider when its respective shaft tends to run ahead of the other shaft, said outer members being outwardly movable for clutch disengagement, and a single compression spring arranged centrally of said driven slip clutch member and so connected to said outer members as to yieldably oppose the disengaging movements thereof.

11. In an axle compensator for a vehicle having two opposed axle shafts, a final drive gear and a housing secured thereto; a spider drivably mounted within said housing, driving clutch teeth provided on both side faces of said spider, a driven slip clutch member having teeth formed on both side faces, said member being mounted in said spider and capable of rotational movement relatively thereto, two outer members arranged on opposite sides of said spider and having driven clutch teeth meshing with the driving teeth of said spider, means drivingly connecting said outer members with said shafts, driving slip clutch teeth formed on both of said outer members and meshing with the teeth formed on said driven slip clutch member and adapted to ride over the latter and thereby disengage the respective outer member from said spider when its respective shaft tends to run ahead of the other shaft, said outer members being outwardly movable for clutch disengagement, an axially compressible cage arranged centrally of said driven slip clutch member and so connected with said outer members as to be compressed by the outward movements thereof, and a spring arranged in said cage and opposing compression thereof.

12. In a device for transmitting driving torque to two opposed shafts capable of overrunning each other, a driving clutch member, a pair of driven clutch members normally in engagement with said driving member and adapted to be drivingly connected to said shafts, clutch operating means operative when one of said shafts overruns the other for moving the driven clutch member associated with the overrunning shaft out of engagement with said driving member to effect clutch disengagement, and a compressible cage and a spring housed therein positioned axially within said clutch operating means for both yieldably opposing disengaging movement of said driven clutch members and positively locking said driving and driven clutch members and said clutch operating means together in assembled, unitary relationship.

13. A torque transmitting device according to claim 12 wherein said last named common means comprises a coil spring positioned internally of said driving clutch member, and means for connecting the ends of said spring with the driven clutch members.

14. A torque transmitting device according to claim 12 wherein said driven clutch members are positioned at opposite sides of the driving clutch member and said last named common means comprises a compression spring positioned internally of and coaxially with said driving clutch member, and a pair of telescoping members each connected to one end of said spring and to the driven clutch member positioned at that side of said driving clutch member which is closest the opposite end of the spring.

15. A torque transmitting device according to claim 12 wherein said driven clutch members are positioned at opposite sides of the driving clutch member and said last named common means comprises a compression spring positioned internally of and coaxially with said driving clutch member, and a pair of interdigitated members forming an enclosure for said spring each having one end thereof connected to one end of said spring and the other end to the driven clutch member positioned at that side of said driving clutch member which is closest the opposite end of the spring.

16. In a device for transmitting driving torque to two opposed shafts capable of overrunning each other, an annular driving clutch member, a pair of driven clutch members normally in engagement with said driving member and adapted to be drivingly connected to said shafts, clutch operating means operative when one of said shafts overruns the other for moving the driven clutch member associated with the overrunning shaft out of engagement with said driving member to effect clutch disengagement, a pair of interdigitated members positioned in the bore of said driving clutch member each having one end of each of its fingers connected to one of said driven clutch members, the opposite ends of said fingers being hooked, and a coil spring held under compression between the hooked ends of the fingers of said interdigitated members.

17. In a device for transmitting driving torque to two opposed shafts capable of overrunning each other, an annular driving clutch member, a pair of driven clutch members normally in engagement with said driving member and adapted to be drivingly connected to said shafts, clutch operating means operative when one of said shafts overruns the other for moving the driven clutch member associated with the overrunning shaft out of engagement with said driving member to effect clutch disengagement, axially compressible cage means positioned in the bore of said driving clutch member and so connected with at least one of said driven clutch members as to be compressed by the clutch disengaging movements thereof, and spring means so arranged within said cage means as to oppose compression thereof.

18. A torque transmitting device according to claim 17 wherein said cage means is so constructed and arranged as to shield said spring means against torsional stresses when there is relative rotation between said shafts.

ALBERT F. MYERS.